United States Patent
Lee et al.

(10) Patent No.: US 10,126,719 B2
(45) Date of Patent: Nov. 13, 2018

(54) METHODS FOR CHANGING AN AUTHORITY OF CONTROL FOR A CONTROLLER IN ENVIRONMENT HAVING MULTIPLE CONTROLLERS

(71) Applicant: KT Corporation, Seongnam-si (KR)

(72) Inventors: Se Hui Lee, Daejeon (KR); Jeong Wook Lee, Daejeon (KR); Tae Jin Ahn, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 501 days.

(21) Appl. No.: 14/306,474

(22) Filed: Jun. 17, 2014

(65) Prior Publication Data

US 2014/0371880 A1 Dec. 18, 2014

(30) Foreign Application Priority Data

Jun. 17, 2013 (KR) .................. 10-2013-0068867
Dec. 24, 2013 (KR) .................. 10-2013-0163161

(51) Int. Cl.
*H04L 12/24* (2006.01)
*G05B 15/02* (2006.01)
*H04L 12/26* (2006.01)

(52) U.S. Cl.
CPC ............ *G05B 15/02* (2013.01); *H04L 41/042* (2013.01); *H04L 43/0817* (2013.01); *H04L 43/10* (2013.01); *H04L 41/0213* (2013.01); *H04L 41/0893* (2013.01)

(58) Field of Classification Search
CPC .. G06F 17/30899; G06F 11/3668; G06F 8/67; G06F 9/4401; G06F 9/4406; G06F 13/4068; G06F 13/4282; G06F 15/7803
See application file for complete search history.

(56) References Cited

U.S. PATENT DOCUMENTS

| | | | |
|---|---|---|---|
| 6,754,761 B1* | 6/2004 | Asaad ................ | G06F 13/4027 710/311 |
| 7,069,468 B1* | 6/2006 | Olson ................. | G06F 11/2092 714/4.2 |
| 2002/0159401 A1 | 10/2002 | Boger | |
| 2003/0083782 A1* | 5/2003 | Borrego ............... | G06F 3/0601 700/245 |
| 2003/0152026 A1* | 8/2003 | Lohr ................... | H04Q 3/54558 370/221 |

(Continued)

FOREIGN PATENT DOCUMENTS

KR 1020110056190 A 5/2011

*Primary Examiner* — Robert E Fennema
*Assistant Examiner* — Marzia T Monty
(74) *Attorney, Agent, or Firm* — Sughrue Mion, PLLC

(57) ABSTRACT

Disclosed is a method for changing a role over control authorization performed in a communication apparatus. The method may comprise receiving, from a second controller, a role-request message requesting a role change of the second controller to a master controller; transmitting a role status request message for confirmation of the role change of the second controller to a first controller which is a previous master controller; and determining whether to accept the role change of the second controller according to a role status response message received from the first controller. Therefore, reliability may be guaranteed when a role of master controller is changed.

12 Claims, 8 Drawing Sheets

(56) References Cited

U.S. PATENT DOCUMENTS

2007/0186020 A1    8/2007   Drexler et al.
2010/0040041 A1    2/2010   Zechlin et al.
2010/0077105 A1    3/2010   Chung et al.
2014/0281669 A1*   9/2014   DeCusatis ........... G06F 11/2005
                                                714/4.11

* cited by examiner

FIG. 8

| field | size (byte) | type | description |
|---|---|---|---|
| version | 1 | uint8_t | version |
| type | 1 | uint8_t | Message type |
| length | 2 | uint16_t | Message length |
| xid | 4 | uint32_t | Transaction ID generated when message is requested |
| generation_id | 8 | uint64_t | Generation ID of a newly elected master controller |
| role | 4 | uint32_t | Role of controller (for example, MASTER/SLAVE/EQUAL) |

METHODS FOR CHANGING AN AUTHORITY OF CONTROL FOR A CONTROLLER IN ENVIRONMENT HAVING MULTIPLE CONTROLLERS

CLAIM FOR PRIORITY

This application claims priorities to Korean Patent Application No. 10-2013-0068867 filed on Jun. 17, 2013 and No. 10-2013-0163161 filed on Dec. 24, 2013 in the Korean Intellectual Property Office (KIPO), the entire contents of which are hereby incorporated by references.

BACKGROUND

1. Technical Field

Example embodiments of the present invention relate to a software-defined networking technology, and more specifically to a method for changing a role over control authorization for a controller in an environment having multiple controllers.

2. Related Art

The networks comprising conventional routers and switches are configured with complex protocols and functions. Since operation methods and user interfaces for them are different according to vendors of apparatuses, it is difficult for network operators and researchers on network technologies to develop new network protocols to be applied to networks, to expand the network, and to make the network apparatuses interwork with each other. In order to overcome the above-described problem, there have been studies on technologies of switches and routers having open-type interface. However, since the network technologies based on the open-type interfaces are expensive as compared with their performances, their commercialization was not achieved easily.

'OpenFlow' technology appeared in order to resolve the high cost problem, and provide users and developers with open-type standardized interfaces.

The OpenFlow technology separates a packet forwarding function and a control function of a network switch, and provides a standardized protocol for communicating between the two functions. Therefore, if the OpenFlow technology is used, packet paths may be determined by using software driven in an external control apparatus, and traffic may be controlled more precisely than the conventional technologies.

Open Networking Foundation (ONF) has defined a software defined networking (hereinafter, referred to as 'SDN') technology which can enable easier network programming possible based on OpenFlow.

A SDN structure based on OpenFlow comprises a plurality of OpenFlow switches and at least one controller. The OpenFlow switches and the controller may be connected to each other by using the OpenFlow protocol.

In the SDN network based on OpenFlow, a controller may provide flow table information to switches, and the switches may change properties of packets using the provided flow table information, or process the packets by controlling flows of the packets.

A switch may be connected to multiple controllers, and each controller connected to a switch may have at least one of control authorities such as a Master, a Slave, or an Equal. Here, since a controller acting as a master may perform a command function related to traffic control for the switches, it is very important to a switch which controller has a master controller authority.

Meanwhile, in addition to the ONF, various standardization organizations such as an Internet Engineering Task Force (IETF), an European Telecommunication Standards Institute (ETSI), an International Telecommunications Union-Telecommunication (ITU-T), etc. have been progressing standardization on the SDN-based networks.

For example, an Interface to Router System (I2RS) working group of IETF is progressing standardization for providing open-type interfaces to monitor and control conventional network apparatuses from external.

An agent in the I2RS may communicate with multiple clients, and a client may perform an advance procedure with the agent so that the agent assigns a security role to the client. That is, a different role may be assigned to each client, and precedence of commands transmitted from each client to the agent may be determined according to the assigned role. Therefore, a role of the client is also very important in the I2RS. The client of I2RS corresponds to the switch of OpenFlow, and the agent of I2RS corresponds to the controller of OpenFlow.

As described above, in a network environment where multiple controllers are connected to communication apparatus such as a switch or a router, and a master controller controls operations of the communication controller, a role of the controller is very important. Accordingly, the reliability of changing a role (or, control authority) of a controller should be guaranteed.

However, in the conventional method that a controller which newly obtains a right of master reports the role change to a switch unidirectionally, the reliability of changing a role of a controller may not be guaranteed.

SUMMARY

Accordingly, example embodiments of the present invention are provided to substantially obviate one or more problems due to limitations and disadvantages of the related art.

Example embodiments of the present invention provide a method for changing a role over control authorization which can guarantee reliability of role change of a controller in an environment comprising multiple controllers.

The objectives which the present invention pursues are not restricted to the above-described objective, and any other objectives which are not described in the present specification may be clearly understood to persons skilled in the art to which the present invention pertains.

In some example embodiments, a method for changing a role over control authorization performed in a communication apparatus, may comprise receiving, from a second controller, a role-request message requesting a role change of the second controller to a master controller; transmitting a role status request message for confirmation of the role change of the second controller to a first controller which is a previous master controller; and determining whether to accept the role change of the second controller according to a role status response message received from the first controller.

Here, the role-request message may include identification information indicating that the second controller performs as a master controller.

Here, the identification information may be a value increased from identification information of the first controller.

Here, the identification information may be a generation identity (ID).

Here, the role status request message may be transmitted as including identification information indicating a role of the second controller.

Here, the determining whether to accept the role change of the second controller may comprise checking a role of the first controller based on the role status response message; changing the role of the second controller to a new master controller if the role of the first controller is changed; and transmitting a role-reply message indicating that the second controller is changed to the new master controller to the second controller.

Here, the determining whether to accept the role change of the second controller may comprise checking a role of the first controller based on the role status response message; maintaining the role of the first controller as a master controller if the role of the first controller is not changed; and transmitting an error message indicating that a role of the second controller is not changed to the second controller.

In other example embodiments, a method for changing a role over control authorization performed in a second controller, may comprise transmitting a role-request message requesting a role change of the second controller to a master controller to a communication apparatus; receiving a role-reply message indicating acceptance or error on the role change from the communication apparatus; and changing a role of the second controller to a master controller if the role-reply message indicating acceptance on the role change is received from the communication apparatus.

Here, the role-request message may include a generation identity indicating that the second controller is a master controller and role information of the second controller.

Here, the receiving the role-reply message may comprise not changing the role of the second controller if the role-reply message indicates the error.

In other example embodiments, a method for changing a role over control authorization performed in a communication apparatus, may comprise receiving a role-request message, from a second controller which is to be a new master controller, including a request of a role change of the second controller to a master controller; checking validity of the request of the role change by comparing identification information included in the role-request message with pre-stored identification information; and transmitting an error message to the second controller if the request of the role change is not valid.

Here, the identification information may be a generation identity (ID).

Here, the checking validity of the request of the role change may comprise comparing the generation identity included in the role-request message with a stored generation identity; and determining that the request of the role change is invalid if the generation identity included in the role request message is not larger than the pre-stored generation identity.

Here, the method may further comprise transmitting a role-reply message including role information of the second controller to the second controller if the request of the role change is valid.

BRIEF DESCRIPTION OF DRAWINGS

Example embodiments of the present invention will become more apparent by describing in detail example embodiments of the present invention with reference to the accompanying drawings, in which:

FIG. 8 illustrates an example of a message used for changing a role of a controller according to an example embodiment of the present invention.

DESCRIPTION OF EXAMPLE EMBODIMENTS

Figure 1:
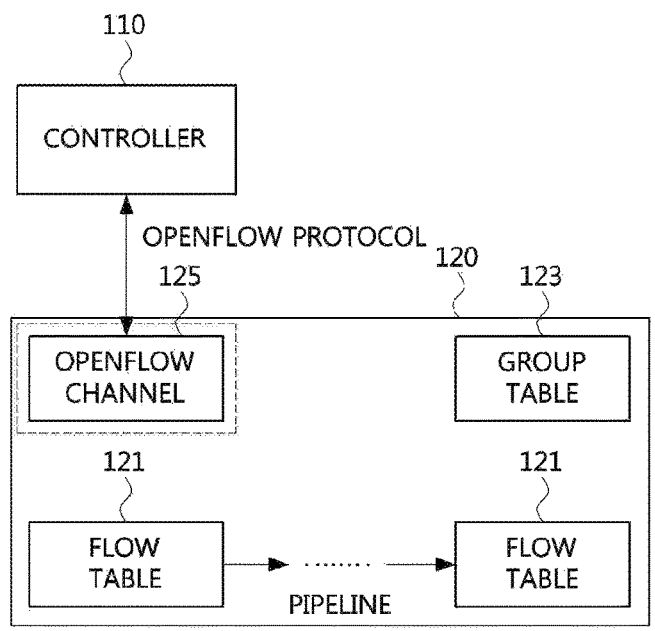
FIG. 1 is a block diagram illustrating a configuration of a SDN system.

Example embodiments of the present invention are disclosed herein. However, specific structural and functional detail disclosed herein are merely representative for purposes of describing example embodiments of the present invention, however, example embodiments of the present invention may be embodied in many alternate forms and should not be construed as limited to example embodiments of the present invention set forth herein. Accordingly, while tie invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "on" or "below" another element, it can be directly on another element or intervening elements may be present.

It will be understood that, although the terms first, second, A, B, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 'control apparatus' or a 'controller' in the specification means a functional entity controlling related components (for example, switches, routers, etc.) in order to control flows of traffic, and is not restricted to a specific physical implementation or a specific implementation position. For example, the controller may mean a controller functional entity defined in ONF, IETF, ETSI, or ITU-T. Also, a 'communication apparatus' or a 'switch' in the specification means a functional entity performing traffic (or, packet) forwarding, switching, or routing, and means a switch, a router, a switching element, a routing element, a forwarding element, etc. defined in ONF, IETF, ETSI, or ITU-T.

Also, the example embodiments of the present invention in the following description may be supported by standard specification documents written in ONF, IETF, ETSI, or ITU-T which are progressing standardization on SDN technologies. In other words, parts of the example embodiments which are not explained in the following description in order to clarify the technical spirit of the present invention may be supported by the standard documents written by the above-described standardization organizations. Also, all terminologies used in the present invention may be explained based on the above standard documents.

Hereinafter, embodiments of the present invention will be described in detail with reference to the appended drawings. In the following description, for easy understanding, like numbers refer to like elements throughout the description of the figures regardless of number of the figures.

Figure 2:
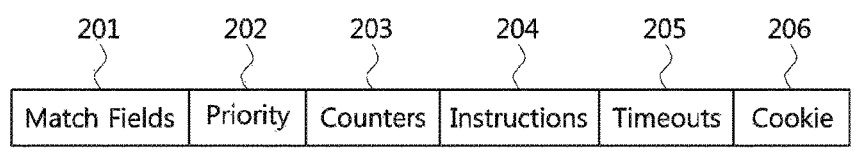
FIG. 2 illustrates a structure of flow entries included in a flow table.

FIG. 1 is a block diagram illustrating a configuration of a SDN system, and FIG. 2 illustrates a structure of flow entries included in a flow table.

Referring to FIG. 1, a SDN system may comprise a plurality of switches and at least one controller, and the plurality of switches and at least one controller may communicate with each other by using OpenFlow protocol. For convenience of explanation, a controller 110 and a switch 120 are illustrated in FIG. 1. However, multiple switches and multiple controllers may exist in the SDN system.

The switch 120 may comprise one or more flow tables 121, group tables 123 used for packet lookup and packet forwarding, and an OpenFlow channel 125 for communicating with the controller 110.

Each flow table 121 included in the switch is a set of flow entries. As illustrated in FIG. 2, each flow entry may be configured with a 'Match' field 201, a 'Priority' field 202, a 'Counters' field 203, a 'Instructions' field 204, a 'Timeouts' field 205, and a 'Cookies' field 206.

The 'Match' field 201 includes information for packet matching. The 'Match' field may include information about an ingress port and information about packet header. Optionally, the 'Match' field may include metadata indicated in a previous flow table. The 'Priority' field 202 may mean a matching priority of the flow entry. The 'Counters' filed 203 may mean a value updated when packet is matched. The 'Instructions' field 204 may be used for modifying action sets or pipeline processing. The 'Timeout' field 205 may mean a maximum time or idle time until expiration of a flow by the switch. The 'Cookie' field 206 is an opaque data value selected by the controller, and may be used for the controller to filter flow statistics, flow-modified, flow-removed, etc.

The matching for packet processing may be started from a first flow table among the plurality of flow tables 121 included in the switch 120, and continued in the following tables.

When the matched flow entry is found, the switch 120 may execute an instruction related to the specific matched flow entry. Otherwise, when the matched flow entry is not found in a flow table, the switch 120 may forward a packet to the controller 110 via the OpenFlow channel 125, or may drop the packet. Alternatively, the next flow table may continue matching process on the packet.

The instructions related to each flow entry may include instructions for action and instructions for modifying pipeline processes in the switch.

The action included in the instruction may describe packet forwarding, packet modification, and group table processing. For example, the action may instruct a packet to be delivered to a group specifying additional processing. Here, a group may represent a set of actions for processing flooding and more complex forwarding. Output actions common for packets related to a plurality of flow entries may be efficiently processed by using a group.

Instructions for pipe line processing may make packets delivered to the next flow table, and information in metadata form exchanged between flow tables. The pipe-line processing on the flow tables may be stopped when an instruction set related to matching flow entry does not specify the next flow table. At this time, packets are generally modified or forwarded.

Also, a flow entry may forward a packet to a port. Here, a port may mean a physical port or a logical port defined by the switch 120. Also, a port may mean a predefined reserved port. A reserved port may specify a comprehensive process such as transmitting a packet to the controller 110, flooding, or a packet forwarding using general methods except OpenFlow. Meanwhile, the logical ports defined by the switch 120 may specify a link aggregation group, tunnels, or a loopback interface.

A group table comprises a plurality of group entries. Each group entry may comprise an action bucket list having specific semantics related to type of the group. Here, an action bucket means a set of actions and related parameters. One or more actions included in an action bucket may deliver packets to a group.

The controller 110 may add, modify, or delete flow entries in the flow table 121 of each of the switches 120 by using OpenFlow protocol.

The OpenFlow protocol supports three message types such as a controller-to-switch type, an asynchronous type, and a symmetric type. Each message type includes a plurality of sub-type messages.

A controller-to-switch type message is a message generated by the controller 110, and used for managing the switch 120 directly or checking states of the switch 120. An asynchronous type message is a message generated by the switch 120, and used for updating information stored in the controller 110 according to network events and changes of states of the switch 120. A synchronous type message is a message generated by the switch 120 or the controller 110, and a message transmitted bi-directionally without an additional request.

A controller-to-switch type message includes a role-request message, a modify-state message, a barrier message, etc. The role-request message is a message used for the controller 110 to configure its role or query about its role, and used in a multi-controller environment. The modify-state message is a message transmitted from the controller 110 to the switch 20 in order to manage state of the switch 120, and used for adding, deleting, or modifying flow entry or group entry of the OpenFlow table 121, configuring properties of ports in the switch 120. A barrier message comprises a barrier request message and a barrier response message, and is used for maintaining dependency between messages transmitted from the controller 110 to the switch 120, and used for the switch 120 to report completion of the messages to the controller 110.

An asynchronous message may include a flow-removed message, a port-status message, etc. A flow-removed message is used for the switch 120 to report deletion of a flow entry in the flow table to the switch 120. A port-status message is used for the switch 120 to report change of a port.

A symmetric message may include a hello message, an echo message, an error message, etc. A hello message is a message exchanged between the controller 110 and the switch 120 when the connection is established. An echo message comprises an echo request message and an echo response message, and may be transmitted by the switch 120 or the controller 110. The apparatus which receives the echo request message should transmit the echo response message. An error message is a message used by the switch 120 or the controller 110, and used for reporting an error to a counterpart of the connection.

Meanwhile, a switch may establish a connection with a single controller, or may establish connections with multiple controllers. Here, if a switch establishes multiple connections with multiple controllers, reliability may be enhanced as compared with a case that a connection with a single controller is established. That is, if a switch has multiple connections with multiple controllers, the switch may continue its operation in OpenFlow mode even when some failures occur in some controllers connected to the switch or connections to some controllers are released.

In the multi-controller environment, controllers may transmit controller-to-switch commands to a switch, and a switch may transmit a response message or an error message only to a controller which transmitted the controller-to-switch command. However, an asynchronous message may be transmitted to all controllers.

In the multi-controller environment, a default role of each controller is 'Equal'. Controllers whose roles are 'Equal' have all access rights for a switch, and have rights equal to other controllers whose roles are 'Equal.' A controller may change its role to 'Slave', and a slave controller has a read-only access right for a switch. Also, a controller may change its role to 'Master'. A master controller has all access rights for a switch similarly to the 'Equal' controllers. However, a switch has a single master controller for it. When a controller changes its role to a master controller, a switch may change a previous master controller to a slave controller. However, a switch does not change roles of previous equal controllers. Also, when a role of a controller is changed from a master to a slave, a switch generates a role status event and reports the role change to the controller whose role is changed.

When a role is changed, a controller transmits a role-request message to a switch in order to report the change of its role, and the switch changes roles of controllers connected to it based on the role-request message, and stores changed roles of the controllers. A switch cannot change roles of controllers by itself. A status (role) of a controller may be changed only by a request of the controller.

Figure 3:
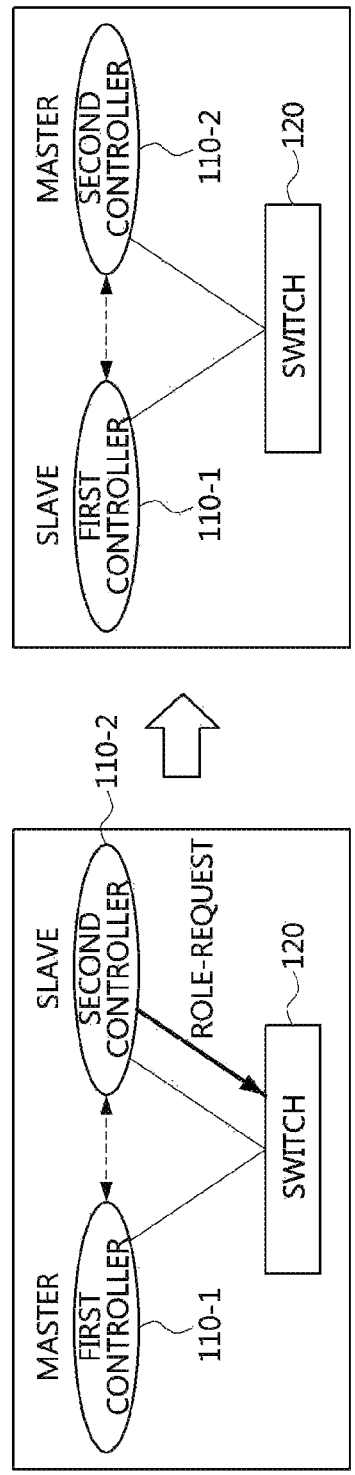
FIG. 3 is a conceptual diagram illustrating a procedure that a slave controller changes its role to a role of master controller in multi-controller environment.

FIG. 3 is a conceptual diagram illustrating a procedure that a slave controller changes its role to a role of master controller in multi-controller environment.

Referring to FIG. 3, it is assumed that an initial role of a first controller 110-1 connected to a switch 120 is a master, and an initial role of a second controller 110-2 is a slave, and roles of them are configured in advance by a master election procedure performed between controllers. Also, the switch 120 may establish and maintain connections with multiple controllers. However, for convenience of explanation, only two controllers 110-1 and 110-2 are illustrated in FIG. 3 as connected to the switch 120.

When the first controller 110-1 and the second controller 110-2 determine to exchange their roles through a negotiation, the second controller 110-2 which is elected as a new master transmits a role-request message to the switch 110-2. Here, the role-request message is a message used for a controller to configure its role, and corresponds to a controller-to-switch type message.

The switch 120 which received the role-request message from the second controller 110-2 may change a role of a previous master controller which is connected to it (the first controller 110-1) to a slave, and change a role of a previous slave controller (the second controller 110-2) to a master.

After changing roles of the controllers, the switch accepts only instructions transmitted from the second controller 110-2 (that is, a newly elected master controller), and rejects all instructions related to traffic control transmitted from the first controller 110-1 (that is, a secondary controller).

Figure 4:
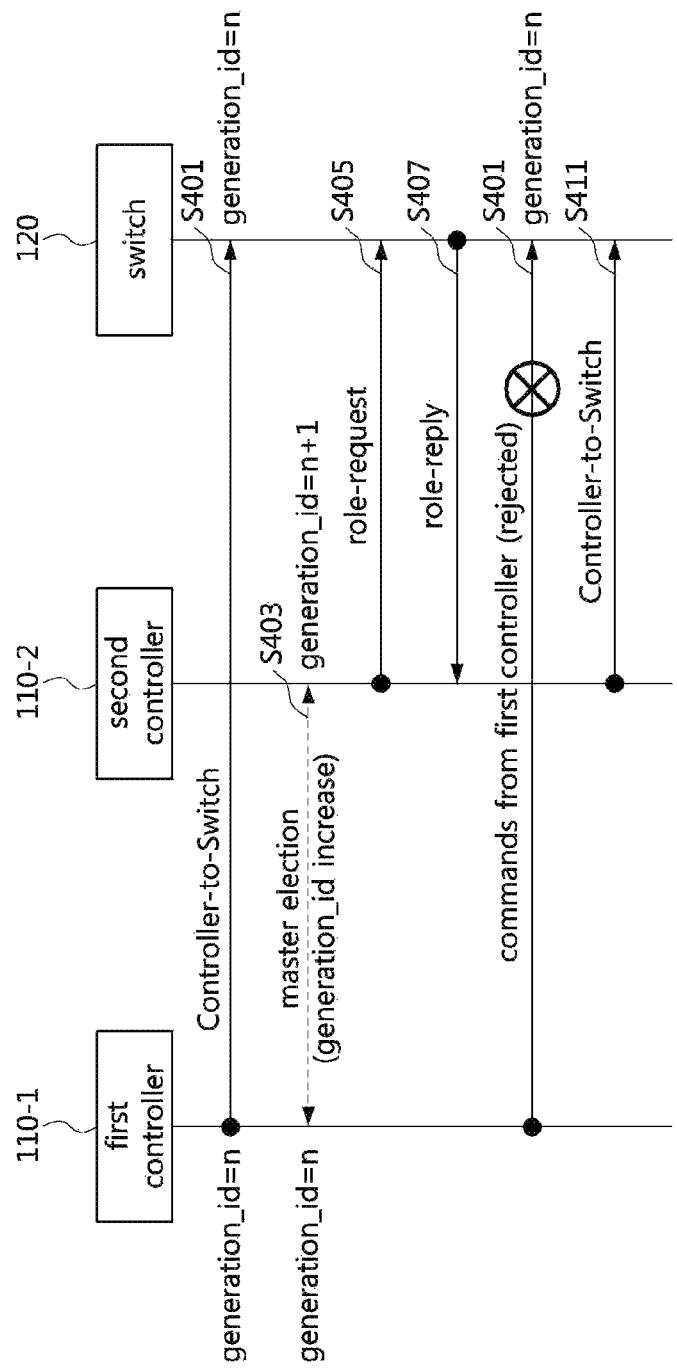
FIG. 4 is a flow chart illustrating a procedure that a slave controller changes its role to a role of master controller in multi-controller environment.

FIG. 4 is a flow chart illustrating a procedure that a slave controller changes its role to a role of master controller in multi-controller environment.

In order for a controller to change its role to a master or a slave, a master election procedure is performed between controllers. In the master election procedure, assignment of generation identity (generation_id) is adjusted. A generation identity is configured as a counter value which is simply increased, or which is increased when a new master is elected. That is, a controller which is elected newly as a master has a bigger generation identity than that of a previous master controller.

Referring to FIG. 4, before a new master is elected, a master controller, a first controller 110-1 provides a command to a switch 120 via a controller-to-switch message (S401). At this time, a generation identity of the first controller 110-1 is supposed to be n (that is, generation_id=n). Also, a role of the second controller 110-2 is supposed to be a slave.

Then, when the second controller 110-2 is elected as a new master controller through a master election procedure performed between the first controller 110-1 and the second controller 110-2, a generation identity of the second controller 110-2 is set to n+1 (S403).

The second controller 110-2 elected as the new master transmits a role-request message to the switch 120 in order to report that the change of its role to the switch 120 (S405).

Here, the role-request message includes the generation identity (that is, n+1) of the second controller 110-2.

The switch 120 receives the role-request message from the second controller 110-2, compares the generation identity (n+1) included in the received message with a previously stored generation identity (n), checks whether the generation identity is increased, changes a role of the second controller 110-2 to a master, and transmits a role-reply message to the second controller 110-2 (S407).

After then, the switch 120 does not accept control commands transmitted from the first controller 110-1 (S409), and accepts only control command transmitted from the second controller 110-2 (S411).

In the method for changing a role of controller depicted in FIGS. 3 and 4, when a controller among a plurality of controller connected to a switch reports a role-request message to the switch, the switch performs only comparison between generation identities. If a generation identity included in the role-request message is bigger than a stored generation identity, the switch accepts the role change, and changes a role of the controller which transmitted the role-request message to a master, and prevents other controllers form operating in master mode.

In the above-described method for changing role of controller, the method is fully dependent on a role-request message transmitted from a controller to a switch. That is, a reciprocal procedure, for checking the role change, between a controller and a switch does not exist. Therefore, when a role of controller is changed by a switch based on a malicious role change invoked by an arbitrary controller or a role-request message transmitted by an abnormal controller, traffic control may be in a mess.

Since a switch receives important traffic control commands from a master controller, a role of a master controller is very important. Therefore, reliability in the procedure for changing role of master controller should be guaranteed.

Hereinafter, a method for changing control authority (or, role) of a controller, which can meet the above-described requirements, according to an example embodiment of the present invention will be explained.

Figure 5:
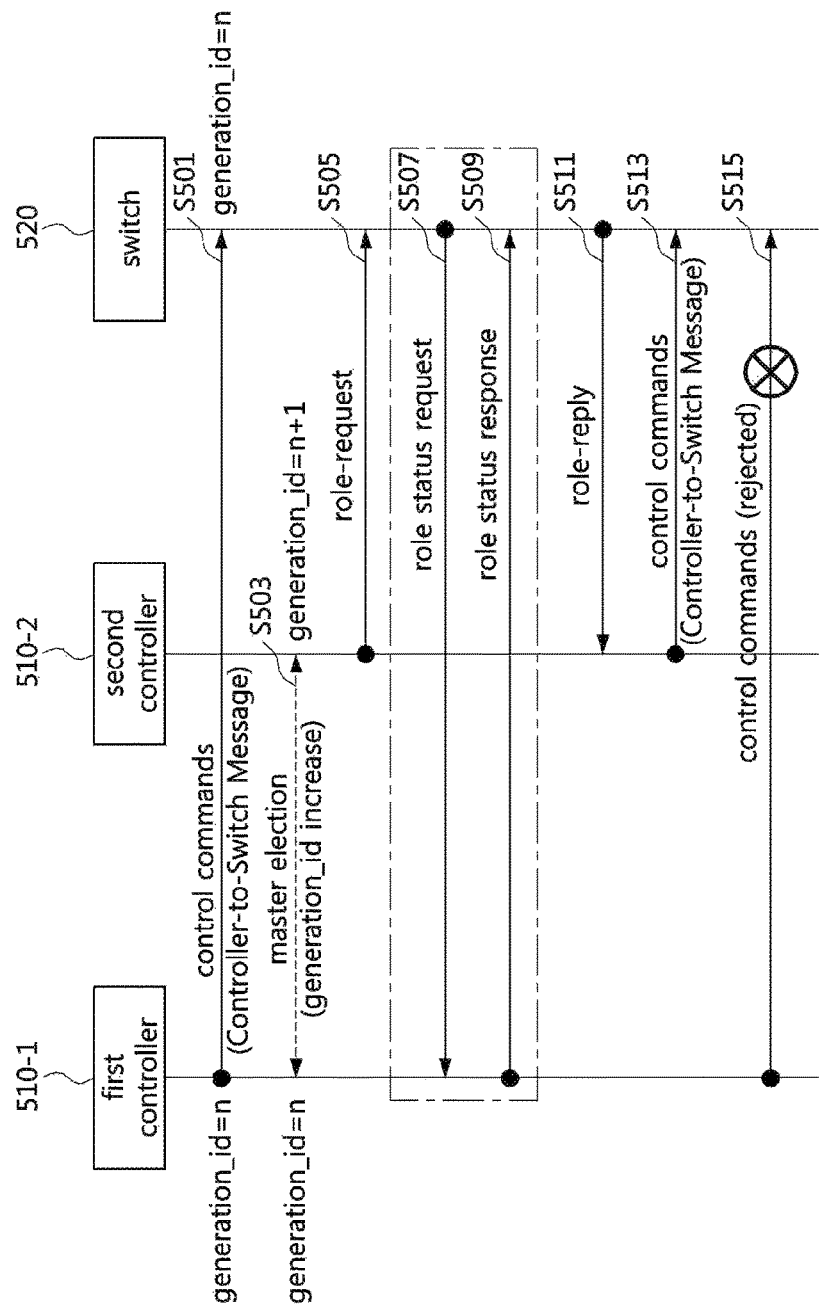
FIG. 5 is a flow chart illustrating a method for changing control authority of a controller according to an example embodiment of the present invention.

FIG. 5 is a flow chart illustrating a method for changing control authority of a controller according to an example embodiment of the present invention.

FIG. 5 illustrates an example where a role of a second controller 510-2 is changed from a slave to a master. It is assumed that a switch 520 maintains connections with a first controller 510-1 and the second controller 510-2, and an initial role of the first controller 510-1 is a master, and an initial role of the second controller 510-2 is a slave.

The first controller 510-1 which is a master controller initially transmits a command related to traffic control to the switch 520 by using a predefined control message (for example, a controller-to-switch type message) (S501). At this time, the first controller 510-1 may have identification information assigned to a master controller. Here, the identification information may be configured as a value or data having various formats. The identification information assigned to a newly elected master controller may be configured as a value increased from the value assigned to the previous master controller or a value different from previous identification information. However, hereinafter, for convenience of explanation, the identification information is supposed to be a generation identity, and a generation identity increased from a previous generation identity is supposed to be assigned to the newly elected master controller. In FIG. 5, a generation identity of the first controller 510-1 is supposed to be n (that is, generation_id=n).

In the above-described situation, if the second controller 510-2 tries to change its role to a master role, the first controller 510-1 and the second controller 510-2 perform a master election procedure. Then, when the second controller 510-2 is elected as a new master controller through the master election procedure, the second controller 510-2 obtains a generation identity (n+1) bigger than the generation identity (n) of the first controller 510-1.

Then, the second controller 510-2 which is elected as the new master transmits a message reporting that its role is changed to a master (hereinafter, a role-request message) to the switch 520 (S505). Here, the role-request message may include the generation identity of the second controller 510-2 (that is, n+1).

The switch 520 receives the role-request message from the second controller 510-2, and determines whether the received generation identity is increased by comparing the generation identity included in the received message with the stored generation identity. When the generation identity included in the role request message is bigger than the previous generation identity, the switch 520 may perform a reciprocal checking procedure (S507 and S509) for the role change of the second controller 510-2. On the contrary, when the generation identity included in the role request message is not bigger than the previous generation identity, the switch 520 may transmit an error message indicating that error occurred in the role change to the second controller 510-2 and/or the first controller 510-1, and maintain the role of the first controller 510-1 as the master controller.

In FIG. 5, an example, in which the generation identity included in the role-request message is bigger than the previous generation identity and the switch 520 performs a reciprocal checking procedure (S507 and S509) for the role change of the second controller 510-2, is illustrated. The reciprocal checking procedure is a procedure for checking whether the role change of the controller is normally performed by the master election procedure, and may mean a procedure performed by the switch 520 and the previous master controller (the first controller 510-1 in the example depicted in FIG. 5).

The switch 520 transmits a role status request message including the generation identity (n+1) to the first controller 510-1 (S507). Here, the role status request message may be configured in various formats. For example, the role status request message may be configured as an echo request message.

When the first controller 510-1 receives the role status request message from the switch 520, the first controller 510-1 compares the generation identity (n+1) included in the role status request message with its generation identity (n). When the generation identity (n+1) included in the role status request message is bigger than its generation identity (n), the first controller 510-1 identifies that the generation identity included in the role status request message is the generation identity of the second controller 510-2 elected as a master controller through the master election procedure, and transmits a role status response message to the switch 520 (S509). Here, the role status response message may include validity information of the role change or role information of the first controller 510-1. Here, the role status response message may be configured in various formats. For example, the role status response message may be configured as an echo reply message.

If the switch 520 receives the role status response message from the first controller 510-1, the switch 520 checks whether the role of the second controller 510-2 is changed normally based on the received message. When the role change of the second controller 510-1 is performed normally, the switch 520 transmits a role-reply message to the second controller 510-2, and changes, in the switch, the role of the second controller 510-2 to the master (S511).

As described above, after the role change of the second controller 510-2 is completed in the switch 520, the switch 520 accepts control messages (for example, controller-to-switch messages) transmitted only from the new master controller, the second controller 510-2, does not accept traffic control messages transmitted from the first controller 510-1 (S515).

Figure 6:
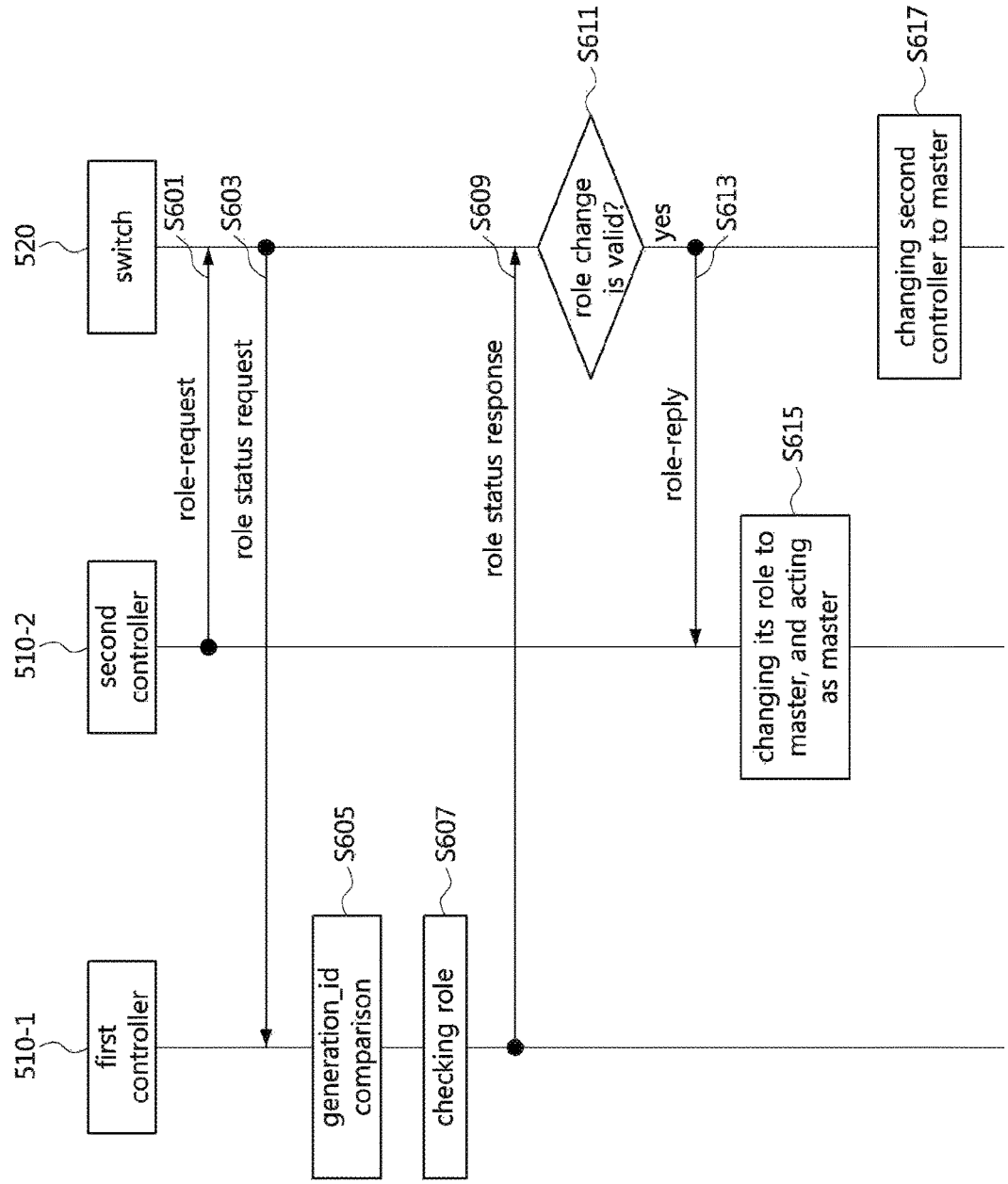
FIG. 6 is a detail flow chart illustrating a method for changing a role of a controller according to an example embodiment of the present invention.

FIG. 6 is a detail flow chart illustrating a method for changing a role of a controller according to an example embodiment of the present invention.

FIG. 6 illustrates a role change procedure that a second controller 510-2 is elected as a new master through a master election procedure performed between a first controller 510-1 and a second controller 510-2 when a switch 520 maintains connections with the first controller 510-1 and the second controller 510-2.

The second controller 510-2 elected as a new master controller transmits a role-request message to the switch 520 (S601). Here, the role-request message may include a generation identity of the second controller 510-2.

The switch 520 receives the role-request message from the second controller 510-2, and transmits a status check request message including the generation identity of the second controller 510-2 to the first controller 510-1 (S603).

When the first controller 510-1 receives the status check request message from the switch 520, the first controller 510-1 compares the generation identity included in the status check request message (that is, the generation identity of the second controller 510-2) with its generation identity (S605), and checks its role based on the comparison result (S607).

Then, the first controller 510-1 transmits a status check response message according to the comparison result to the switch 520 (S609). Here, the status check response message may include information about current role of the first controller 510-1 or information indicating validity check result of the role change. Also, the status check response message may include the generation identity of the first controller 510-1, or identification information indicating a role of the first controller 510-1.

The switch 520 receives the status check response message from the first controller 510-1, and determines validity of the role change of the second controller 510-2 based on information included in the received message (S611). Here, when the information included in the status check response message indicates that the role of the first controller 510-1 is a slave, the switch 520 may determine that the role change of the second controller 510-2 is valid.

When the switch 520 determines the role change of the second controller 510-2 is performed normally, the switch 520 transmits a role-reply message to the second controller 510-2 (S613), and changes the role of the second controller 510-2 to a master (S617).

The second controller 510-2 which receives the role response message from the switch 520 changes its role to a master, and performs the role of master controller for the switch 520 (S615).

Figure 7:
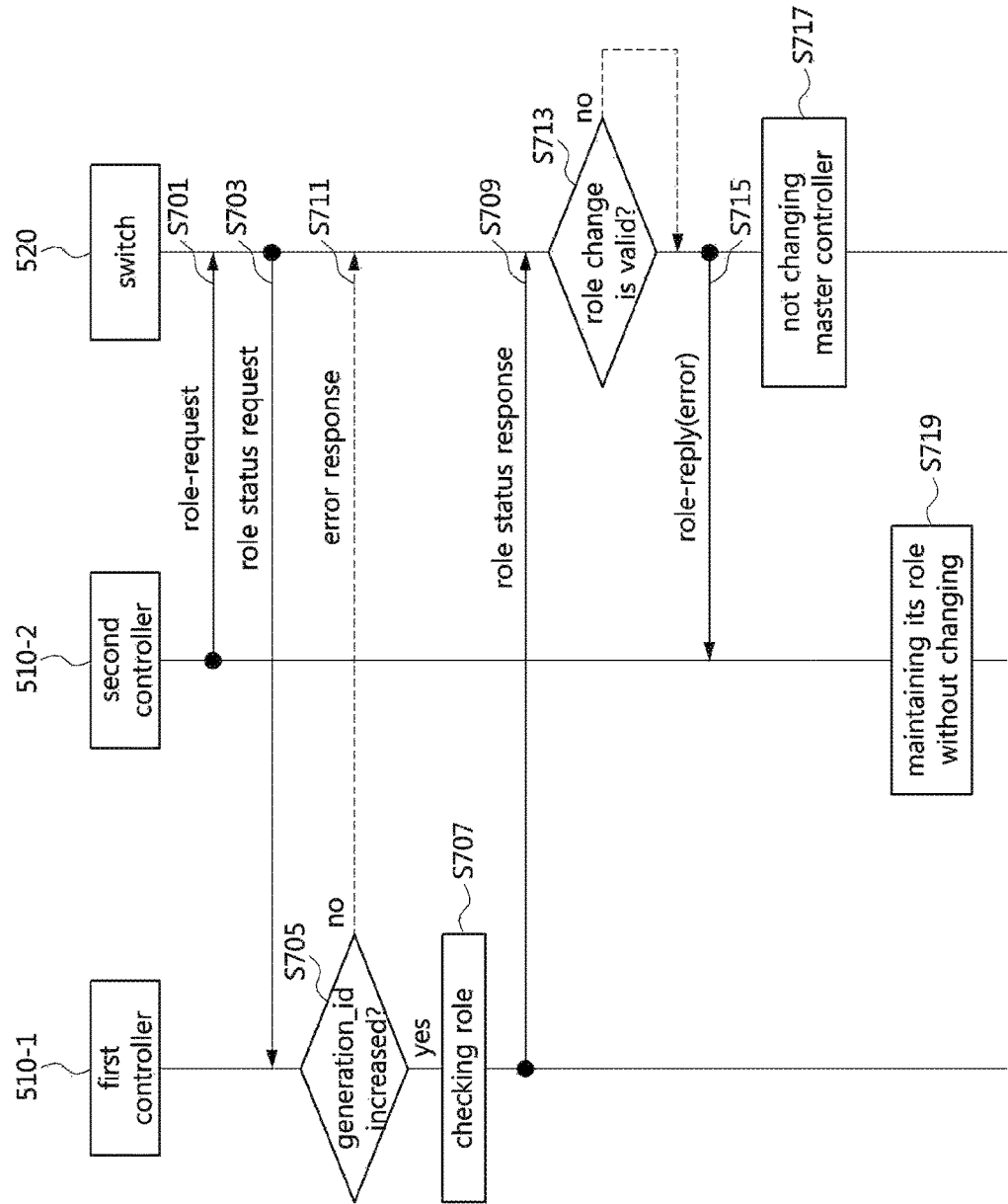
FIG. 7 is a flow chart illustrating a procedure for changing a role of controller according to other example embodiment of the present invention, and illustrates a procedure for a switch to reject a role request of a controller in detail.

FIG. 7 is a flow chart illustrating a procedure for changing a role of controller according to other example embodiment of the present invention, and illustrates a procedure for a switch to reject a role request of a controller in detail.

FIG. 7 illustrates an example of a procedure that a switch 520 rejects a role request of a second controller 510-2 when the switch 520 maintains connections with a first controller 510-1 and the second controller 510-2.

First, the second controller 510-2 transmits a role-request message to the switch 520 (S701). Here, the role-request message may include a generation identity of the second controller 510-2.

When the switch 520 receives the role-request message from the second controller 510-2, the switch 520 transmits a role status request message included the generation identity of the second controller 510-2 to the first controller 510-1 (S703).

The first controller 510-1 receives the role status request message from the switch 520, compares the generation identity included in the role status request message (that is, the generation identity of the second controller 510-2) with its generation identity, and checks whether the generation identity of the second controller is bigger than its generation identity (S705).

Then, according to the comparison result, the first controller 510-1 transmits a role status response message indicating that the role change is valid to the switch 520, or a role-reply message indicating that the role change is invalid to the switch 520.

Here, the first controller 510-1 may transmit a role status response message including its role information to the switch 520 (S709), after the first controller 510-1 identified that the generation identity included in the role status request message is bigger than its generation identity (S707).

Alternatively, the first controller 510-1 may transmit a role-reply message including error information to the switch 520 when the generation identity included in the role status request message is not bigger than its generation identity (S711). Alternatively, the first controller 510-1 may be configured not to transmit any message to the switch 520 when the generation identity included in the role status request message is not bigger than its generation identity. In this case, the switch 520 may be configured to identify that the role change of the second controller 510-2 is invalid if any response is not received from the first controller 510-1 for a predetermined time period.

The switch 520 determines whether the role change of the second controller 510-2 is valid or not based on the response message received from the first controller 510-1 (S713). Here, when the switch 520 receives an error response message from the first controller 510-1, the switch 520 may transmit a role response message indicating rejection on the role change to the second controller 510-2 (S715), and may not change a master controller (S717).

Alternatively, when the switch 520 receives the role status response message from the first controller 510-1, the switch 520 checks the role of the first controller 510-1 included in the role status response message, and checks whether the role of master controller is changed normally. Here, when the role of the first controller 510-1 indicates a master role, the switch 520 may identify that the role change is not completed normally, and transmit an error message to the second controller 510-2.

Alternatively, when the switch 520 does not receive any response message from the first controller 510-1 for a predetermined time period, the switch 520 may be configured to transmit a role error message to the second controller 510-2, and not to change a role of the master controller.

If the second controller 510-2 receives the role error message from the switch 520, it may not change its role, and continue acting its role (S719).

Alternatively, when the second controller 510-2 receives a role error message from the switch 520 or does not receive a role request message indicating acceptance of the role change for a predefined time period, the second controller 510-2 may again transmit a role request message requesting the role change to the switch 520. Here, the switch 520 may also be configured to accept the role change when it receives a predefined number of role request messages from the second controller 510-2.

Also, although the switch 520 transmits a role status request message only to the first controller 510-1 in FIGS. 5 and 7, when the switch 520 is connected to a plurality of slave controllers, the switch 520 may be configured not to transmit role status request messages to all the slave controllers, and to transmit a role status request message only to a previous master controller.

FIG. 8 illustrates an example of a message used for changing a role of a controller according to an example embodiment of the present invention. The example illustrates a state request message and a state reply message.

The status check request message and the status check response message are configured with the same formats, and may include fields such as 'version', 'type', 'length', 'transaction identity (xid)', 'generation identity', 'role', etc.

The 'version' field may be configured as a 1-byte field, and represent a supported protocol version.

The 'type' field may be configured as a 1-byte field, and represent a type of the message.

The 'length' field may be configured as a 2-byte field, and represent a length of the message.

The 'transaction identity' field may be configured with four bytes, and represent an identity of a transaction generated when the message is requested.

The 'generation identity' field may be configured with eight bytes, and represent a generation identity of a newly elected master controller.

The 'role' field may be configured with four bytes, and represent a role of the controller. Here, the role of the controller may be set to one of 'Master', 'Slave', and 'Equal'.

When the switch generates a state request message and transmits the message to the controller, the switch may transmit the message a generation identity field of which is set to the corresponding value to the controller, and the controller may generate a role status response message and transmit the message a role field of which is set to its role.

Figure 9:
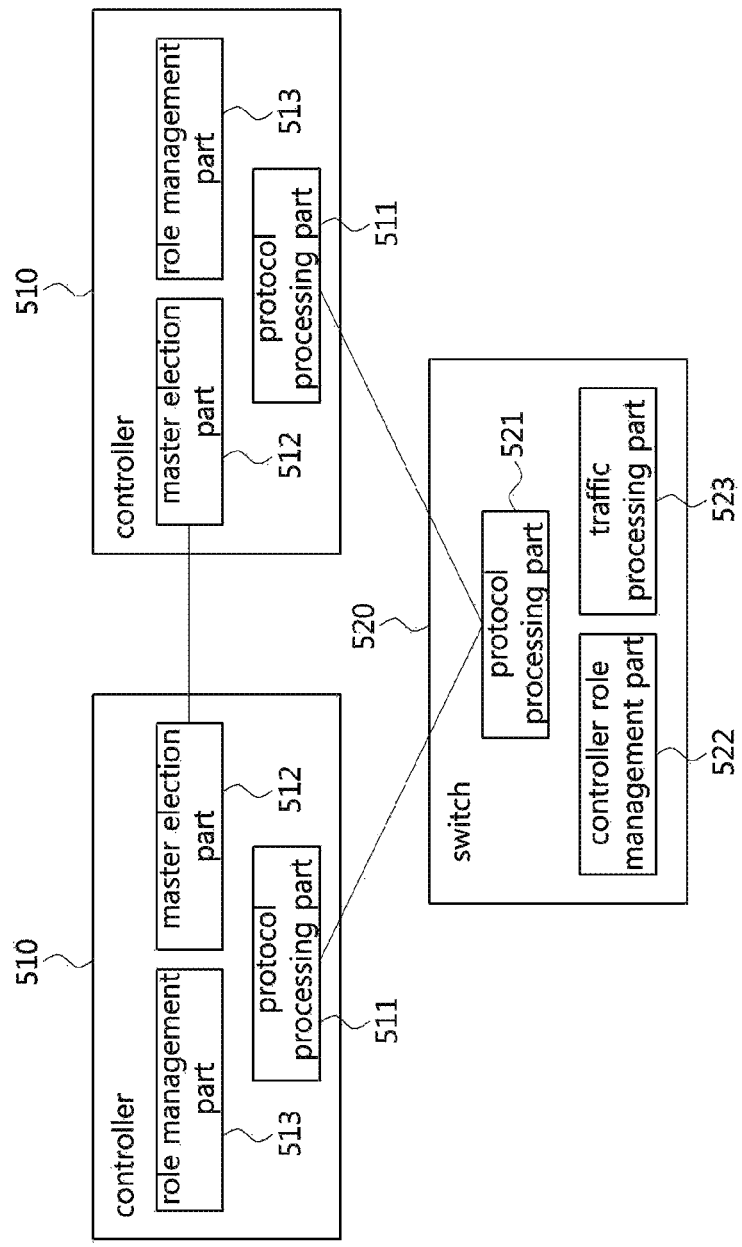
FIG. 9 is a block diagram illustrating configurations of a controller and a switch performing a method for changing a role of a controller according to an example embodiment of the present invention.

FIG. 9 is a block diagram illustrating configurations of a controller and a switch performing a method for changing a role of a controller according to an example embodiment of the present invention.

Referring to FIG. 9, a controller 510 may comprise a protocol processing part 511, a master election part 512, and a role managing part 513.

The protocol processing part 511 performs communications with the switch 520 based on the predefined protocols. That is, the protocol processing part 511 may perform traffic control and traffic management based on the predefined protocols. For example, the protocol processing part 511 may perform control and management on the switch 520 based on the OpenFlow protocols or the I2RS protocols.

The master election part 512 performs master election based on negotiation with master election parts of other controllers. Here, the master election part 512 may exchange messages related to the master election with other master election parts of other controllers, and elects a master based on the exchanged messages.

The role management part 513 performs processes related to role change of the controller 510. For example, the role management part 513 may manage identification information (for example, a generation identity) related to a current role of the controller 510, and perform procedures needed for the role change of the controller 510. That is, the role management part 513 may transmit a role request message to the switch 520 when the controller changes its role to a master, and change or maintain the role of the controller 510 according to a response message received from the switch 520. Alternatively, when the controller 510 changes its role from a master to a slave, the role management part 513 may receive a role status request message from the switch 520, and transmit a role status response message to the switch 520 after checking its role in response to the role status request message.

The switch 520 may comprise a protocol processing part 521, a controller role management part 522, and a traffic processing part 523.

The protocol processing part 521 performs communications with the controller 510 based on the predefined protocols. That is, the protocol processing part 521 may receive control commands from the controller 510, or transmit responses for the received control commands to the controller 510 based on the predefined protocols. For example, the protocol processing part 521 may communicate with the controller 510 according to the OpenFlow protocol or the I2RS protocol.

The controller role management part 522 may perform processes related to a role of the controller 510. For example, the controller role management part 522 may receive a role request message from an arbitrary controller, and transmit a role status request message requesting a check of the role change to the previous master controller. Also, the controller role management part 522 receives the role status response message from the previous master controller, checks validity of the role change based on the received message, transmits a response message indicating acceptance of the role change or rejection of the role change to the controller which requested the role change based on the result of validity check. Here, when the validity of the role change is confirmed, the controller role management part 522 may change the role of the controller which requested the role change to a role of master.

The traffic processing part 523 may perform a function of processing traffic under control of the controller 510. Here, the traffic processing part 523 may manage an OpenFlow table under control of the controller 510, and process traffic based on the OpenFlow table.

While the example embodiments of the present invention and their advantages have been described in detail, it should be understood that various changes, substitutions and alterations may be made herein without departing from the scope of the invention.

What is claimed is:

1. A method for changing a role over control authorization performed by a communication apparatus, in a software defined network (SDN) environment where the communication apparatus, a first controller, and a second controller exist, the method comprising:
receiving, from the second controller, a role-request message requesting a role change of the second controller to a master controller;
transmitting a role status request message for confirmation of the role change of the second controller to the first controller which is a previous master controller; and
determining whether to accept the role change of the second controller according to a role status response message received from the first controller, wherein the communication apparatus is a different type of device than the first and second controllers, wherein the communication apparatus performs the receiving, transmitting, and determining operations, wherein the role status request message is transmitted as including identification information indicating a role of the second controller, and wherein the role-request message includes identification information of the second controller which is generated by the second controller in response to a result of an election process.

2. The method of claim 1, wherein the role-request message includes identification information indicating that the second controller performs as a master controller.

3. The method of claim 2, wherein the identification information includes a value increased from identification information of the first controller.

4. The method of claim 1, wherein the identification information includes a generation identity (ID).

5. The method of claim 1, wherein the determining whether to accept the role change of the second controller comprises:
 checking a role of the first controller based on the role status response message;
 changing the role of the second controller to a new master controller if the role of the first controller is changed; and
 transmitting a role-reply message indicating that the second controller is changed to the new master controller to the second controller.

6. The method of claim 1, wherein the determining whether to accept the role change of the second controller comprises:
 checking a role of the first controller based on the role status response message;
 maintaining the role of the first controller as a master controller if the role of the first controller is not changed; and
 transmitting an error message indicating that a role of the second controller is not changed to the second controller.

7. The method of claim 1, wherein the communication apparatus is a switch.

8. The method of claim 1, wherein the identification information of the second controller is generated by the second controller by incrementing identification information of the first controller.

9. A method for changing a role over control authorization performed by a second controller, in a software defined network (SDN) environment where a communication apparatus, a first controller, and the second controller exist, the method comprising:
 transmitting a role-request message requesting a role change of the second controller to a master controller to the communication apparatus;
 receiving a role-reply message indicating acceptance or error on the role change from the communication apparatus; and
 changing a role of the second controller to a master controller if the role-reply message indicating acceptance on the role change is received from the communication apparatus,
 wherein the communication apparatus is a different type of device than the controllers,
 wherein the receiving the role-reply message comprises not changing the role of the second controller if the role-reply message indicates the error, and
 wherein the role-request message includes a generation identity indicating that the second controller is a master controller and role information of the second controller.

10. The method of claim 9, wherein the communication apparatus is a switch.

11. A method for changing a role over control authorization performed by a communication apparatus, in a software defined network (SDN) environment where the communication apparatus, a first controller, and a second controller exist, the method comprising:
 receiving a role-request message, from the second controller which is to be a new master controller, including a request of a role change of the second controller to a master controller;
 checking validity of the request of the role change by comparing identification information included in the role-request message with pre-stored identification information;
 transmitting an error message to the second controller if the request of the role change is not valid; and
 transmitting a role-reply message including role information of the second controller to the second controller if the request of the role change is valid
 wherein the communication apparatus is a different type of device than the controllers,
 wherein the communication apparatus performs the receiving, checking, and transmitting operations,
 wherein the identification information includes a generation identity (ID), and
 wherein the checking the validity of the request of the role change comprises:
  comparing the generation identity included in the role-request message with a stored generation identity; and
  determining that the request of the role change is invalid if the generation identity included in the role request message is not larger that the pre-stored generation identity.

12. The method of claim 11, wherein the communication apparatus is a switch.

* * * * *